UNITED STATES PATENT OFFICE.

SAMUEL N. METZLER, OF JACKSON, MICHIGAN.

COMPOSITION FOR ROOF-PAINT.

SPECIFICATION forming part of Letters Patent No. 301,742, dated July 8, 1884.

Application filed February 15, 1884. (No specimens.)

*To all whom it may concern:*

Be it known that I, SAMUEL N. METZLER, a citizen of Jackson, in the county of Jackson and State of Michigan, have invented certain new and useful Improvements in Roof-Paints; and I hereby declare that the following is a full, clear, and exact description of the same, which will enable others skilled in the art to which it appertains to make and use the same.

My invention has relation to roof-paints or roofing compounds; and it consists of the following ingredients, in the stated proportions, viz: fifty-six gallons of gas-tar, fifty-six pounds of powdered glass, twenty-eight pounds of Portland cement, twenty-eight pounds of iron ore, twenty-eight pounds of sulphur, fourteen pounds of salt, fourteen pounds of alum, and fourteen pounds of Venetian red, all of which ingredients are finely pulverized, and thereupon thoroughly mixed with the gas-tar by slowly boiling it.

When used, the compound is slowly melted, whereupon it is applied hot, in the usual manner, with a brush.

By incorporating the pulverized glass I obtain durability in wear, as well as make the compound a non-conductor for electricity, while the sulphur and salt harden the compound, and the salt and alum render the compound fire-proof. The glass, cement, and iron ore give body to the compound, for which the gas-tar is the vehicle, rendering it applicable, and the Venetian red serves to give color to the compound. It will be seen that in this manner the compound is fire-proof, very hard and durable, and a non-conductor for electricity, and that it may be used for painting metallic objects or other objects requiring a durable coat of paint, as well as for painting roofs.

I am aware that roofing compounds have been made containing gas-tar, cement, sulphur, and a lead pigment; and I am also aware that powdered minerals, sand, or finely-comminuted metals have been sprinkled over roofing compounds for the purpose of making them durable; but I am not aware that the hardening or fireproofing substances salt and alum, or the non-conducting substance powdered glass, mixed with the mass, have been used; and I therefore claim—

The roof-painting compound consisting of gas-tar, powdered glass, Portland cement, iron ore, sulphur, salt, alum, and Venetian red, mixed together in the proportions and manner stated.

In testimony that I claim the foregoing as my own invention I have hereto affixed my signature in the presence of two witnesses.

SAMUEL N. METZLER. [L. S.]

Witnesses:
CHAS. B. WOOD,
JAS. C. WOOD.